(12) United States Patent
Bradley

(10) Patent No.: US 12,431,707 B2
(45) Date of Patent: Sep. 30, 2025

(54) EMERGENCY BATTERY BACKUP SYSTEM FOR A TRAFFIC SIGNAL

(71) Applicant: Scott Bradley, Orange, CA (US)

(72) Inventor: Scott Bradley, Orange, CA (US)

( * ) Notice: Subject to any disclaimer, the term of this patent is extended or adjusted under 35 U.S.C. 154(b) by 0 days.

(21) Appl. No.: 18/601,783

(22) Filed: Mar. 11, 2024

(65) Prior Publication Data

US 2024/0305095 A1    Sep. 12, 2024

Related U.S. Application Data

(60) Provisional application No. 63/451,323, filed on Mar. 10, 2023.

(51) Int. Cl.
*H02J 3/00* (2006.01)
*G08G 1/07* (2006.01)
*H02J 7/35* (2006.01)

(52) U.S. Cl.
CPC ............ *H02J 3/001* (2020.01); *G08G 1/07* (2013.01); *H02J 7/35* (2013.01); *H02J 2300/24* (2020.01)

(58) Field of Classification Search
CPC .......... H02J 3/001; H02J 7/35; H02J 2300/24; G08G 1/07
See application file for complete search history.

(56) References Cited

U.S. PATENT DOCUMENTS

| | | | |
|---|---|---|---|
| 7,040,773 B1* | 5/2006 | Zincone | G08G 1/095 362/183 |
| 2002/0008629 A1* | 1/2002 | Jinno | G08G 1/097 340/642 |
| 2016/0148507 A1* | 5/2016 | Pittman | G06Q 30/0255 340/917 |

* cited by examiner

*Primary Examiner* — Robert L Deberadinis
(74) *Attorney, Agent, or Firm* — Eric Karich; Karich & Associates

(57) ABSTRACT

An emergency battery backup system for a traffic signal has a control board operably connected to a battery, wherein the control board includes a DC input terminal that is operably connected to the battery for receiving DC power from the battery, and a DC output terminal that is operably connected to a red light of the traffic signal. The control board further includes AC input terminals for receiving AC power, and AC output terminals that are operably connected to the red light, and to a yellow light and a green light of the traffic signal. The control board directs DC power from the DC input in the event of a loss of AC power, so that the red LED goes into a flash mode to alert drivers that the traffic signal head is out.

7 Claims, 3 Drawing Sheets

EMERGENCY BATTERY BACKUP SYSTEM FOR A TRAFFIC SIGNAL

CROSS-REFERENCE TO RELATED APPLICATIONS

This application for a utility patent claims the benefit of U.S. Provisional Application No. 63/451,323, filed Mar. 10, 2023.

BACKGROUND OF THE INVENTION

Field of the Invention

This invention relates generally to traffic signals, and more particularly to an emergency battery backup system for a traffic signal.

Description of Related Art

Traffic signals rely on AC current from a power grid to provide signals at an intersection to prevent traffic accidents and to keep people safe. Power outages, unfortunately, can occur, commonly from failures of the power grid, cut wires, and other causes, which can interrupt this AC current, and put people at risk due to failures of the traffic signal operation. When power is completely cut, a traffic signal is left dark, which can often lead to collisions in the intersection, since none of the drivers are given a bright signal or warning.

The prior art approach is to include a battery backup in a control cabinet, which serves an entire intersection. The disadvantage of this approach is that a single cut can result in the entire intersection being deprived of power. This is especially a problem since copper theft has become so common in many cities.

The current invention solves this problem by locating the battery backup in a signal head of the traffic signal, an approach that goes against the teachings of the prior art, and solves the long-felt need for a system that prevents a dark intersection every time power wires are damaged, cut, or stolen. The present invention fulfills these needs and provides further advantages as described in the following summary.

SUMMARY OF THE INVENTION

The present invention teaches certain benefits in construction and use which give rise to the objectives described below.

The present invention provides an emergency battery backup system that includes a control board operably connected to a battery, wherein the control board includes a DC input terminal that is operably connected to the battery for receiving DC power from the battery, and a DC output terminal that is operably connected to a red light of the traffic signal. The control board further includes AC input terminals for receiving AC power, and AC output terminals that are operably connected to the red light, and to a yellow light and a green light of the traffic signal. The control board directs DC power from the DC input in the event of a loss of AC power, so that the red LED goes into a flash mode to alert drivers that the traffic signal head is out.

A primary objective of the present invention is to provide an emergency battery backup system having advantages not taught by the prior art.

Another objective is to provide an emergency battery backup system that enables a traffic signal to remain illuminated in a flashing mode in the event of AC power outage, so that drivers can be alerted to the fact that there is a problem with the traffic signal.

Another objective is to provide an emergency battery backup system that is located in a signal head of the traffic signal, so that cuts in or around the control cabinet do not results in a total failure that results in a dark intersection.

A further objective is to provide an emergency battery backup system that is able to maintain itself in a charged state with renewable energy such as solar.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, an emergency battery backup system for a traffic signal. The emergency battery backup system ensures that the traffic signal will flash red in the event of a power outage, so that drivers and pedestrians are warned that the traffic signal is out, and to proceed with caution, thereby preventing traffic accidents.

Figure 1:
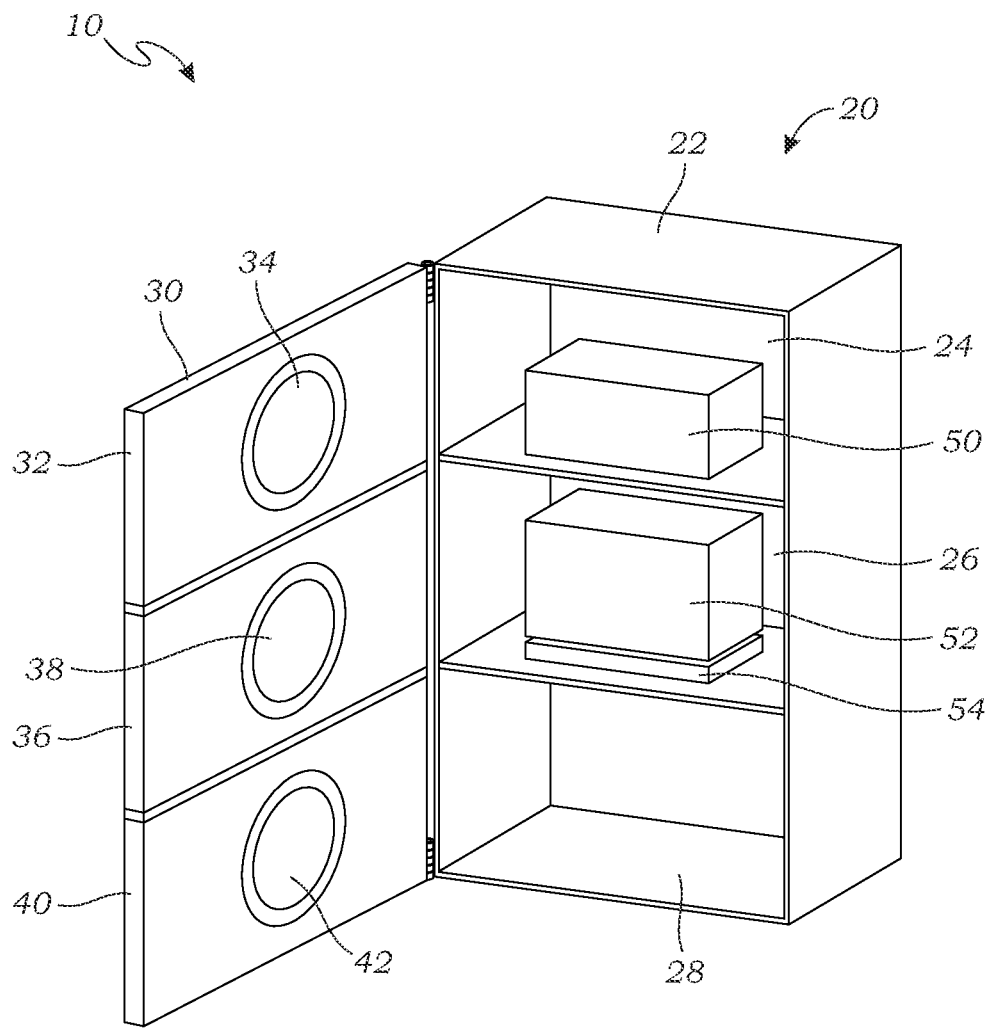
FIG. 1 is a perspective view of a traffic signal head that incorporates an emergency battery backup system, according to one embodiment of the present invention.

FIG. 1 is a perspective view of a traffic signal head 20 that incorporates an emergency battery backup system 10 according to one embodiment of the present invention. As shown in FIG. 1, the traffic signal head 20 includes a signal head housing 22 that includes, in this embodiment, a red light housing 24 above a yellow light housing 26 which is above a green light housing 28. One or more covers 30 are provided to cover the housings 24, 26, 28, in this case mounted on hinges which allow them to move between open and closed positions. In this case a red light cover 32 which mounts a red light 34 (e.g., LED), a yellow light cover 34 which mounts a yellow light 38, and a green light cover 40 which mounts a green light 42.

As illustrated in FIG. 1, a battery 50 of the emergency battery backup system 10 is stored in the traffic head 20, in this case in the red light housing 24. Also, a control board 52 and a landing strip 54 are also positioned within the head 20, in this case in the yellow light housing 26. Obviously, other mounting positions may be used, so long as these components are properly protected from the elements, and adjacent the signal head 20 so that only a small amount of protected copper wire is required to connect the battery 50 and the lights.

Figure 2:
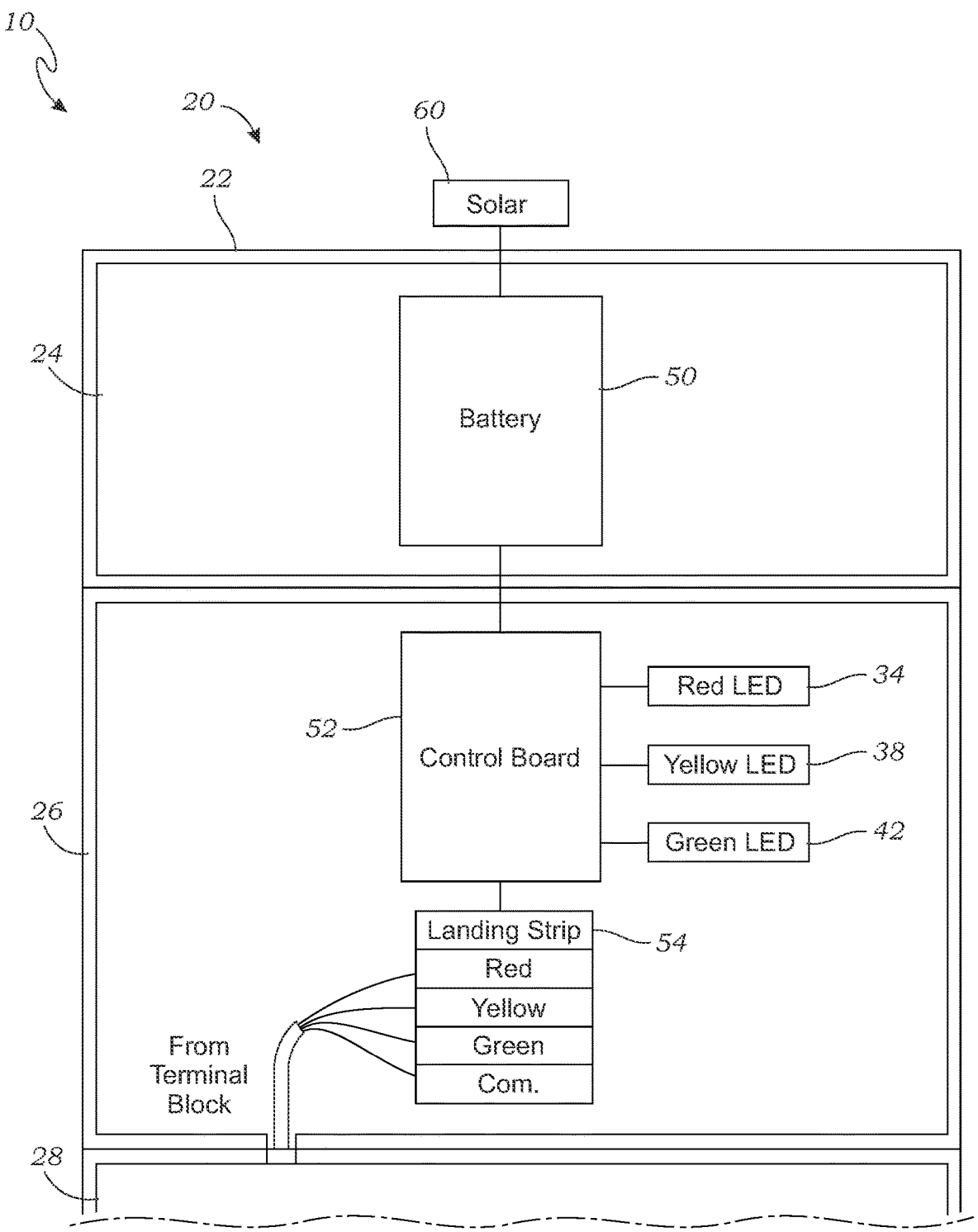
FIG. 2 is a front elevation view of an upper portion of the traffic signal head, illustrating the installation of the emergency battery backup system with the traffic signal.

FIG. 2 is a front elevation view of an upper portion of the traffic signal head 20, illustrating in block diagram form the components of the emergency battery backup system 10 within the traffic signal head 20. As shown in FIG. 2, the battery 50 may be operably connected to a solar panel 60, which may be mounted on top of the traffic signal head 20 to keep the battery 50 charged, and to recharge the battery 50 as it is drained during use, providing substantially longer battery life.

Figure 3:
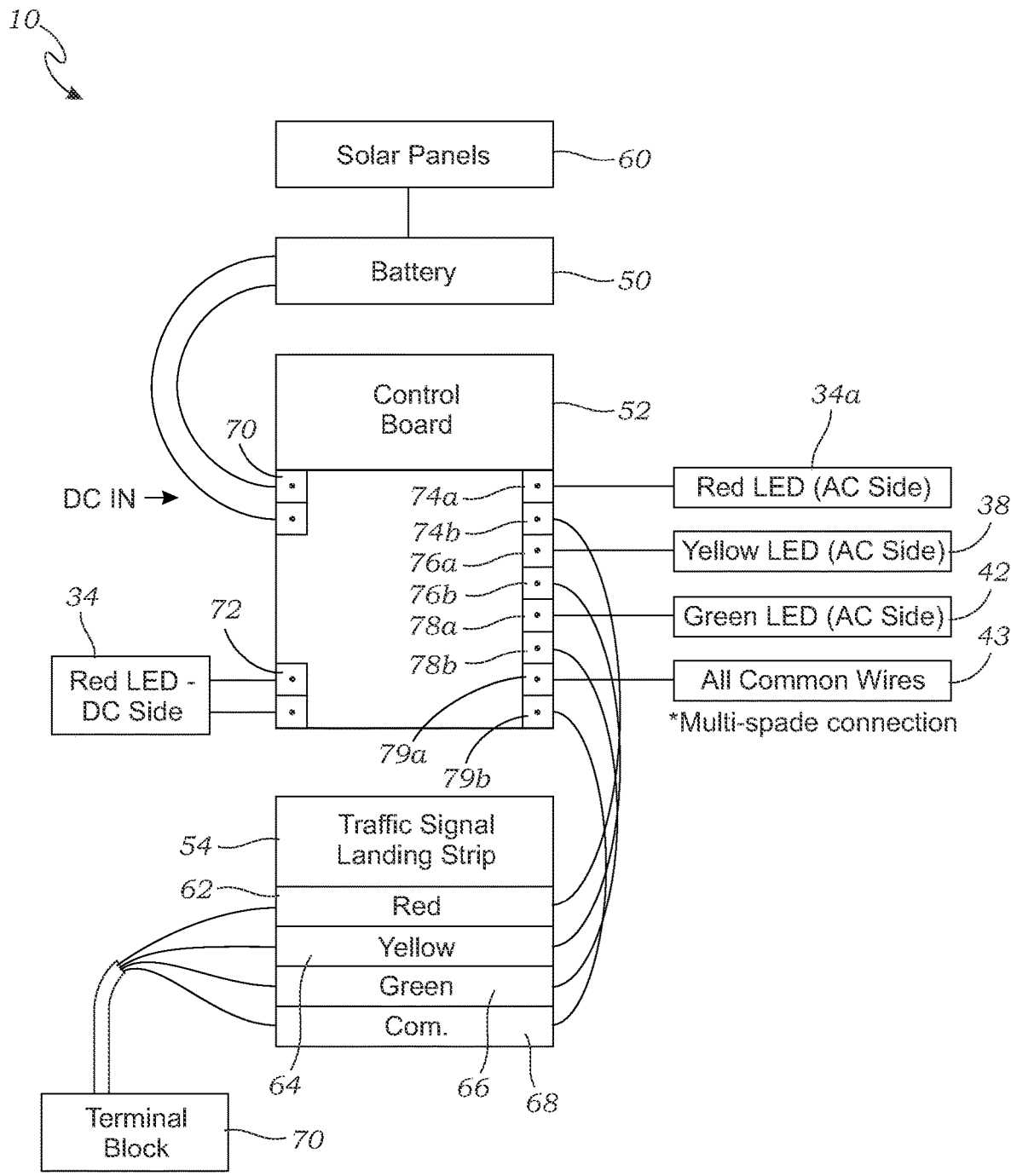
FIG. 3 is a block diagram of the emergency battery backup system of FIGS. 1 and 2.

FIG. 3 is a block diagram of the emergency battery backup system 10 of FIGS. 1 and 2. As shown in FIG. 3, the control board 52 includes DC input terminals 70 (e.g., screw terminals, or equivalent connectors) for receiving DC power from the battery 50, and DC output terminals 72 for operably connection with the red light 34. This connection is made to the DC side of the red light, and does not go through the inverter circuitry as the AC power does, thereby avoiding the power loss that would result in the DC power being converted to AC, and then back through the inverter circuitry of the red light.

The control board also includes a red light terminal 74a for operably connection to the red light (AC side) 34a, and a red AC power in terminal 74b for connection of the control board 52 with an AC power source, in this case via a red connector 62 of the landing strip 54.

The control board also includes a yellow light terminal 76a for operably connection to the red light (AC side) 38, and a red AC power in terminal 76b for connection of the control board 52 with an AC power source, in this case via a yellow connector 64 of the landing strip 54.

The control board also includes a green light terminal 78a for operably connection to the green light 42, and a green AC power in terminal 78b for connection of the control board 52 with an AC power source, in this case via a green connector 66 of the landing strip 54.

Additional connectors 79a and 79b may similarly connect common wires 43 with a com connector 68 of the landing strip 54. The landing strip 54 is operably connected to an AC power source in this case via a terminal block 70.

In operation, while AC power is being received (e.g., via the terminal block 70), the DC power is not used, and the battery 50 is simply left to charge from the solar panels 60 (or from the AC source, in the event that the solar panels 60 are not used). In the event of a loss of AC power, however, such as during a power outage, or if wiring is cut or vandalized, the control board 52 operably connects the DC power from the battery 50 to the red light 34, illuminating the red light 34, preferably flashing in according to ITE standards. This red flashing alerts drivers that the traffic signal is out, and to proceed with caution. Since the flashing operation is provided via the control board in the traffic signal head, it is not affected by cuts and damage in surrounding wires.

The flashing red light 34 is able to maintain flashing operation for significant periods of time, significantly longer than prior art systems, and under most conditions, the solar panel is able to recharge the battery 50 during operation, so that even longer, and perhaps even continuous operation may be maintained, even under emergency conditions where repairs are delayed.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A power failure indicating system for a traffic signal head, the emergency battery backup system comprising:
   a battery;
   a control board operably connected to the battery;
   wherein the control board includes a DC input terminal that is operably connected to the battery for receiving DC power from the battery, and a DC output terminal that is operably connected to a red light of the traffic signal;
   wherein the control board includes AC input terminals for receiving AC power, and AC output terminals that are operably connected to the red light, and to a yellow light and a green light of the traffic signal;
   wherein the control board directs DC power from the DC input in the event of a loss of AC power, so that the red LED goes into a flash mode to alert drivers that the traffic signal head is out.

2. The power failure indicating system of claim 1, further comprising a solar panel operably connected to the battery.

3. The power failure indicating system of claim 1, wherein the control board includes a red light terminal for operably connection to the red light, and a red AC power in terminal for connection of the control board with an AC power source, via a red connector of a landing strip.

4. A power failure indicating in a traffic signal head comprising:
   a housing that includes a red light housing above a yellow light housing which is above a green light housing, one or more covers which cover the housings and which mount a red light, a yellow light, and a green light;
   a battery and a control board mounted in the traffic signal head, the control board being operably connected to the battery;
   wherein the control board includes a DC input terminal that is operably connected to the battery for receiving DC power from the battery, and a DC output terminal that is operably connected to a red light of the traffic signal;
   wherein the control board includes AC input terminals for receiving AC power, and AC output terminals that are operably connected to the red light, and to a yellow light and a green light of the traffic signal;
   wherein the control board directs DC power from the DC input in the event of a loss of AC power, so that the red LED goes into a flash mode to alert drivers that the traffic signal head is out.

5. The power failure indicating system of claim 4, further comprising a solar panel operably connected to the battery.

6. The power failure indicating system of claim 5, wherein the solar panel is mounted on top of the traffic signal head.

7. The power failure indicating system of claim 4, wherein the control board includes a red light terminal for operably connection to the red light, and a red AC power in terminal for connection of the control board with an AC power source, via a red connector of a landing strip.

\* \* \* \* \*